April 7, 1931. P. E. GELDHOF ET AL 1,799,362
ONE-WAY CLUTCH AND OPERATING MECHANISM THEREFOR
Filed Dec. 8, 1925
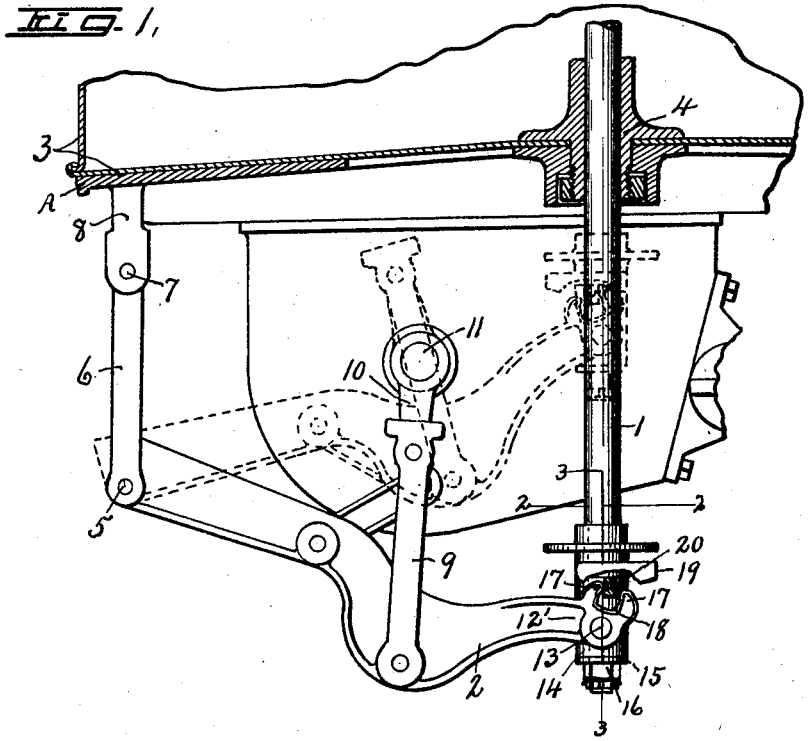
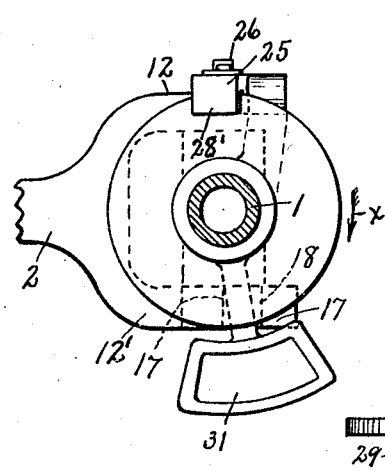
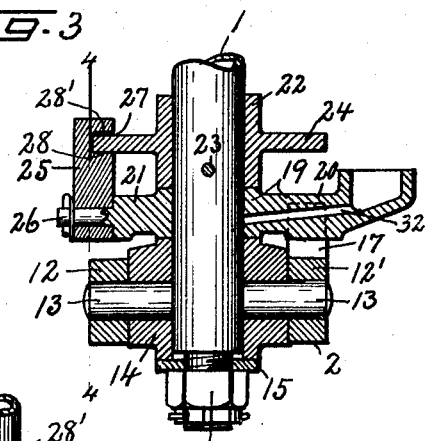
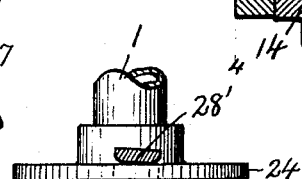
INVENTOR
P. E. Geldhof
L. Ringer
BY Denison & Thompson
ATTORNEYS
WITNESS
H. V. Hurst Patented Apr. 7, 1931

1,799,362

UNITED STATES PATENT OFFICE

PETER E. GELDHOF, OF SYRACUSE, AND LUTHER RINGER, OF UNION SPRINGS, NEW YORK, ASSIGNORS TO SYRACUSE WASHING MACHINE CORPORATION, OF SYRACUSE, NEW YORK, A CORPORATION OF DELAWARE

ONE-WAY CLUTCH AND OPERATING MECHANISM THEREFOR

Application filed December 8, 1925. Serial No. 74,214.

This invention relates to a one-way clutch and operating mechanism therefor for imparting intermittent rotary motion in one direction to axially movable plungers and is particularly useful in connection with clothes washing machines of the vertically-reciprocatory, vacuum-cup-and-pressure type in which a plunger carrying the cups and extending through a gland in the bottom of the tub or vat is reciprocated axially through the medium of a power driven vertically movable rock arm or walking beam beneath the tub and suitable connections between the lever and lower end of the plunger.

These cups are usually mounted in circumferentially spaced relation upon a yoke carried by the upper end of the plunger within the tub or vat for vertical movement into and out of engagement with the clothes as the plunger is reciprocated and, in order that they may act upon all portions of the clothes throughout the horizontal area of the interior of the tub, it is desirable to shift the plunger with the yoke and cups thereon rotarily step by step in one direction as they approach the limit of their upward stroke or when freed from engagement with the clothes and washing fluid.

Various devices, such as pawl and ratchet actions and friction disk clutches, have heretofore been used in the connections between the operating lever and plunger for accomplishing this result.

The use of the ratchet and pawl action is objectionable in that it is accompanied by a more or less clicking noise as the pawl drops from one tooth to another while the use of the friction disk clutch depending upon the weight of the plunger upon the lever is objectionable in that the transmission of rotary motion from the lever to the plunger is more or less unreliable and indefinite as to the amount of each rotary movement.

The main object of the present invention is to provide a practically noiseless operating connection between the lever and plunger and at the same time to assure a more definite and reliable step by step rotary movement of the plunger and cups in one and the same direction and at the same time leaving the plunger and parts carried thereby free to be rotated by hand in the same direction when the power driven parts are at rest.

Other objects and uses relating to specific parts of the indexing device will be brought out in the following description.

In the drawings:

Figure 1 is a vertical sectional view of the lower portion of a tub or vat showing the vertically movable plunger, its operating lever and the indexing device.

Figure 2 is an enlarged horizontal sectional view taken on line 2—2, Figure 1.

Figure 3 is an enlarged vertical sectional view taken on line 3—3, Figure 1.

Figure 4 is a vertical sectional view taken in the plane of line 4—4, Figure 3.

As illustrated, the indexing device is used as a part of the connection between a vertically reciprocating plunger —1— and its operating lever —2— of a clothes washing machine having a tub or vat —3—.

The plunger —1— is reciprocally movable through a gland —4— centrally in the bottom of the tube —3— and is adapted to carry at its upper end the usual supporting yoke for the vacuum cups, not shown.

The lever —2— extends radially and outwardly from the lower end of the plunger —1— beneath the tube or vat —3— and has its outer end pivotally connected at —5— to a link —6— which, in turn, is pivotally connected at —7— to a bracket —8— on the bottom of the frame —A—.

The intermediate portion of the lever —2— is connected by a pitman —9— to a crank arm —10— which is secured to and driven by a power shaft —11—.

The lever —2— is provided with a forked inner end having its opposite arms —12— and —12'— pivotally mounted upon radial trunnions —13— which are carried by a collar —14— on the lower end of the plunger —1—.

This collar —14— is loosely mounted upon the plunger to permit the latter to rotate therein while it is being held against rotation by the engagement of the arms —12— with the trunnions —13—, said collar being held against downward displacement from the plunger by a washer —15— and nut —16— on the lower end of the plunger.

One of the arms as —12'— of the lever —2— is provided with upwardly projecting shoulders —17— in longitudinally spaced relation to form an intervening slot —18— directly over the axis of the trunnions —13—, said shoulders —17— being located some distance to one side of the axis of the plunger or at the corresponding side of the collar —14—.

An oscillating member —19— is loosely mounted on the plunger —1— to rest upon the upper end of the collar —14— and is provided with opposite radially projecting arms —20— and —21—, one of which, as the arm —20—, extends laterally through the slot —18— between the shoulders —17— to be alternately engaged by said shoulders as the lever —2— is rocked vertically in reverse directions and thereby to oscillate the member —19— in reverse directions about the axis of the plunger.

An additional collar —22— is secured by a pin or key —23— to the plunger —1— directly over the member —19— for engagement with the upper end thereof and thereby to hold said member against upward displacement while the collar —14— serves to hold it against downward displacement.

The collar —22— is provided with an annular flange —24— which is preferably surface-hardened to be engaged by a friction pawl —25—, the latter being journaled on a bearing —26— on the outer end of the arm —21— and radial to the axis of the plunger —1—.

The pawl —25— extends upwardly from the bearing —26— across the periphery of the flange —24— and is provided with a transverse slot —27— forming opposed biting shoulders —28— and —28'— for engaging the lower and upper surfaces of the flange —24—, said shoulders —28— and —28'— being also hardened to reduce wear.

A pawl engaging spring —29— is interposed between one side of the pawl —25— and an arm —30— on the member —19— for yieldingly holding the pawl in a position to cause diagonal edges of the shoulders —28— and —28'— to bear against the lower and upper faces of the flange —24— and to force said pawl in a direction opposite that in which the plunger —1— together with the parts carried by the plunger is to be rotated.

The outer end of the member —20— is elongated circumferentially and provided with an oil pocket —31— for receiving a liquid lubricant which is adapted to flow through a passage —32— in said member to the periphery of the plunger —1— for lubricating the bearings for said member and thus permitting its free oscillatory movement.

The spacing of the shoulders —17— is somewhat wider than the adjacent portion of the arm —20— which they are adapted to engage and is arranged so as to cause the outermost shoulder —17— to engage and operate the member —19— in the direction indicated by arrow —x—, Figure 2, through a relatively short arc as the plunger —1— and parts carried thereby approach the limit of their upward movement above the level of the clothes and washing fluid where the resistance to such rotation is reduced to a minimum.

On the other hand during the descent of the plunger and parts carried thereby when the washing mechanism is brought into engagement with the clothes the space —18— between the shoulders —17— allows the plunger and parts carried thereby to remain in their rotarily adjusted position ready for action upon a different portion of the clothes than the previous operation while at the same time the member —19— is free to turn in the opposite direction in case the innermost shoulder —17— should contact with the arm —20— in which case the pawl —25— will simply slide around the periphery of the flange —24—.

Operation

As the lever —2— is rocked vertically from its extreme down position as shown in Figure 1 toward its extreme upper position it will carry the plunger and parts mounted thereon with it and as the shoulders —17— are moved past the dead center or horizontal plane of the pivot —5— and approach the limit of their upward movement the outermost shoulder —17— will be brought into engagement with the arm —20— thereby shifting said arm toward the left hand, Figures 1 and 2, and simultaneously moving the opposite arm —21— toward the right hand of the same figures or toward the left hand, Figure 4, which causes the pivotal pin —26— of the pawl —25— to move in the same direction while the spring acts upon the pawl in a reverse direction above the pivot.

This compound movement of the lower and upper ends of the pawl is reverse directions causes the shoulders —28— and —28'— to grip the lower and upper surfaces of the flange —24— and thereby to move the plunger and parts carried thereby in the same circumferential direction indicated by arrow —x—, Figure 2, for changing the position of the vacuum cups relatively to the clothes in the vat.

As the inner end of the lever —2— is moved downwardly for returning the plunger and parts carried thereby the outermost shoulder —17— will recede from the arm —20— leaving the plunger —1— in its previously adjusted position while the innermost shoulder —17— may engage the arm —20— and return the member —19— to its starting position in which case the pawl —25— will simply slide noiselessly along the periphery of the flange —24—, these operations being repeated during each cycle of movement of the lever —2—.

In devices of this character, it is desirable to construct the intermittent rotary feed mechanism in such manner as to cause partial rotation of the plunger and parts carried thereby when the washing mechanism approaches the limit of its upward movement when it is free from engagement with the clothes or, what may be termed under normal light load and to prevent positive intermittent rotary movement of the washing mechanism in case the clothes should tend to wind around the supporting post for said washing mechanism under which conditions the washing mechanism would be subjected to an abnormal load and the prevention of positive rotary feed under such abnormal load would reduce the liability of tearing or other injury to the clothes during the washing operation.

In order to prevent this positive rotary feed of the washing mechanism under the abnormal conditions named, the first width of the portions of the pawl —25— engaging the opposite faces of the disk —24— and length of the pawl between its pivot —26— and points of engagement of the pawl with the disk have an approximate definite ratio of about sixteen to twenty-seven more or less while the biting corners of the opposed shoulders —28— and —28′— are slightly rounded as shown more clearly in Figure 4 to allow the pawl to slip relatively to the disk in case of an overload upon the washing mechanism.

The ratio of the width of the engaging faces of the pawl to the radius of said faces is carefully calculated to effect a positive rotary feed of the plunger and washing mechanism carried thereby under normal loads or when the washing mechanism is freed from the clothes and to slip upon the disk —24— in case of abnormal loads upon the washing mechanism.

It will be readily understood that if this radius is increased or the distance between the biting edges of the pawl are reduced the biting face of the pawl upon the disk —24— will be increased while on the other hand, if the width of the gripping faces —28— and —28′— is increased or the radius of the pawl reduced the gripping effect of the pawl upon the disk —24— will be correspondingly reduced and it, therefore, becomes necessary to establish a ratio which will produce the desired results previously described.

What we claim is:

1. In a friction pawl clutch, driving and driven elements movable about a common axis, means for simultaneously effecting movement of the driving element vertically and about said axis comprising an annular flange on the driven element, and a friction pawl pivoted to the driving element and provided with opposed gripping faces eccentric to said pivot for releasably engaging opposite sides of the flange during each angular movement of the driving element in one direction, said gripping faces being convex with respect to the annular flange.

2. In a friction pawl clutch, driving and driven elements movable about a common axis, means for simultaneously effecting movement of the driving element vertically and about said axis comprising an annular flange on the driven element, a friction pawl pivoted to the driving element and provided with opposed gripping faces eccentric to said pivot for releasably engaging opposite sides of the flange during each angular movement of the driving element in one direction, said gripping faces being convex with respect to the annular flange, and spring means for yieldingly holding the pawl in its gripping position.

In witness whereof we have hereunto set our hands this 30th day of November, 1925.

PETER E. GELDHOF.
LUTHER RINGER.